United States Patent [19]

Sellers et al.

[11] Patent Number: 5,262,210
[45] Date of Patent: Nov. 16, 1993

[54] QUICK RELEASE VEHICULAR HOOD ORNAMENT

[76] Inventors: Gregory B. Sellers, 9123 Mapleleaf Ct., Hesperia, Calif. 92345; Betty L. Hartwell, 2901 Hawksdale Dr., Las Vegas, Nev. 89134

[21] Appl. No.: 890,860

[22] Filed: Jun. 1, 1992

[51] Int. Cl.⁵ .............................................. B60R 13/00
[52] U.S. Cl. .................................. 428/31; D12/197; 40/591; 280/727
[58] Field of Search ......................... D12/197; 40/591; 280/727; 428/31

[56] References Cited

U.S. PATENT DOCUMENTS

| | | |
|---|---|---|
| 3,678,456 | 7/1972 | Gruber .............................. 40/591 X |
| 3,813,113 | 5/1974 | Burnham .............................. 428/31 X |
| 4,788,550 | 11/1988 | Chadima, Jr. ..................... 428/31 X |
| 4,913,941 | 4/1990 | Tedrahn .............................. 428/31 |
| 4,988,065 | 1/1991 | Leban et al. ...................... 248/624 X |
| 5,002,810 | 3/1991 | Birdwell et al. ...................... 428/31 |

*Primary Examiner*—Henry F. Epstein
*Attorney, Agent, or Firm*—Leon Gilden

[57] ABSTRACT

A hood ornament includes a cylindrical support housing positioned below an associated vehicular hood, with the ornament having a side wall formed with projecting rods displaceable to effect retraction of lock rods mounted within the support housing normally biased through lock rod slots in a first position and collapsed within the housing in a second position interiorly of the housing.

4 Claims, 4 Drawing Sheets

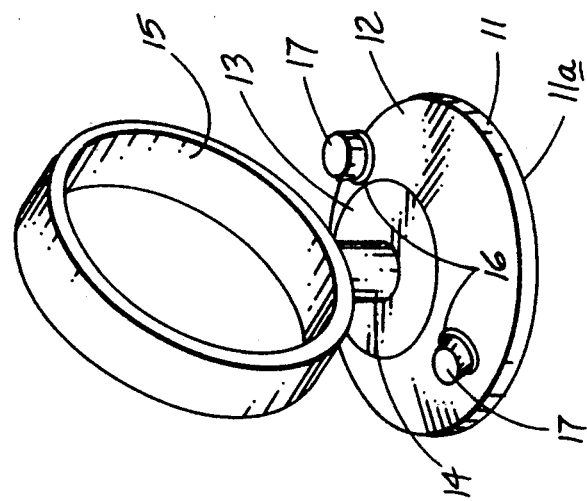
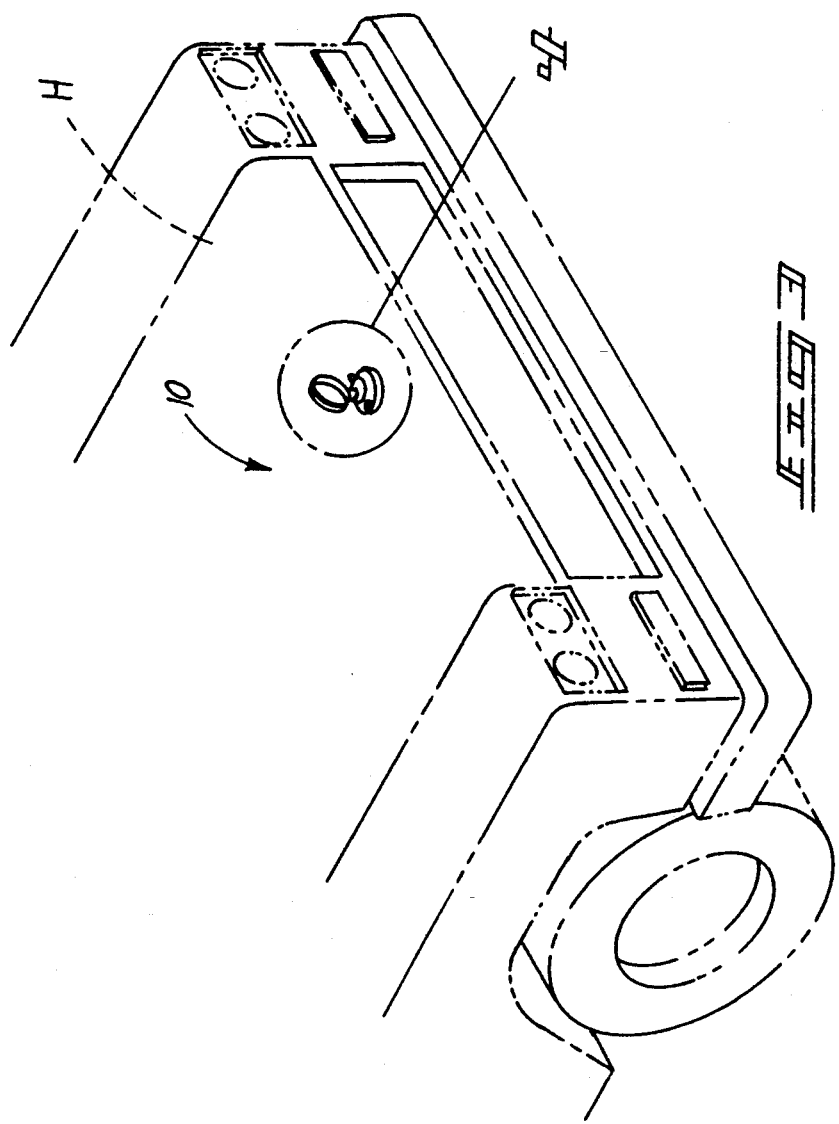

QUICK RELEASE VEHICULAR HOOD ORNAMENT

BACKGROUND OF THE INVENTION

1. Field of the Invention

The field of invention relates to vehicular hood ornament structure, and more particularly pertains to a new and improved quick release vehicular hood ornament to permit ease of removal of the hood ornament relative to an associated vehicular hood.

2. Description of the Prior Art

Hood ornament structure of various types are utilized in the prior art to mount hood ornaments relative to a vehicle hood. In contemporary society, the unauthorized removal to include theft and tampering of such hood ornaments for various unauthorized purposes has been an ever growing concern and problem, wherein such hood ornament structures are typically of expense in their replacement. A removable hood ornament structure is noted in U.S. Pat. No. 4,913,941 wherein a key lock structure is arranged to rotatably mount a hood ornament stem within an associated well within the vehicular hood.

U.S. Pat. No. 4,988,065 sets for a conventional manner of mounting a hood ornament relative to a vehicular hood, with U.S. Pat. No. 4,788,550 to Chadima setting forth a hood ornament utilized as an antenna.

Accordingly, it may be appreciated that there continues to be a need for a new and improved quick release vehicular hood ornament as set forth by the instant invention which addresses the problems of ease of use as well as effectiveness in construction permitting ease of removal of a hood ornament relative to a vehicular hood and in this respect, the present invention substantially fulfills this need.

SUMMARY OF THE INVENTION

In view of the foregoing disadvantages inherent in the known types of hood ornament structure now present in the prior art, the present invention provides a quick release vehicular hood ornament wherein the same is arranged for ease of removal relative to an associated vehicular hood. As such, the general purpose of the present invention, which will be described subsequently in greater detail, is to provide a new and improved quick release vehicular hood ornament which has all the advantages of the prior art hood ornament apparatus and none of the disadvantages.

To attain this, the present invention provides a hood ornament including a cylindrical support housing positioned below an associated vehicular hood, with the ornament having a side wall formed with projecting rods displaceable to effect retraction of lock rods mounted within the support housing normally biased through lock rod slots in a first position and collapsed within the housing in a second position interiorly of the housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the Public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved quick release vehicular hood ornament which has all the advantages of the prior art hood ornament apparatus and none of the disadvantages.

It is another object of the present invention to provide a new and improved quick release vehicular hood ornament which may be easily and efficiently manufactured and marketed.

It is a further object of the present invention to provide a new and improved quick release vehicular hood ornament which is of a durable and reliable construction.

An even further object of the present invention is to provide a new and improved quick release vehicular hood ornament which is susceptible of a low cost of manufacture with regard to both materials and labor, and which accordingly is then susceptible of low prices of sale to the consuming public, thereby making such quick release vehicular hood ornaments economically available to the buying public.

Still yet another object of the present invention is to provide a new and improved quick release vehicular hood ornament which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the invention in use.

FIG. 4 is an isometric illustration of the upper portion of the hood ornament structure of the invention.

DESCRIPTION OF THE PREFERRED EMBODIMENT

Figure 1:
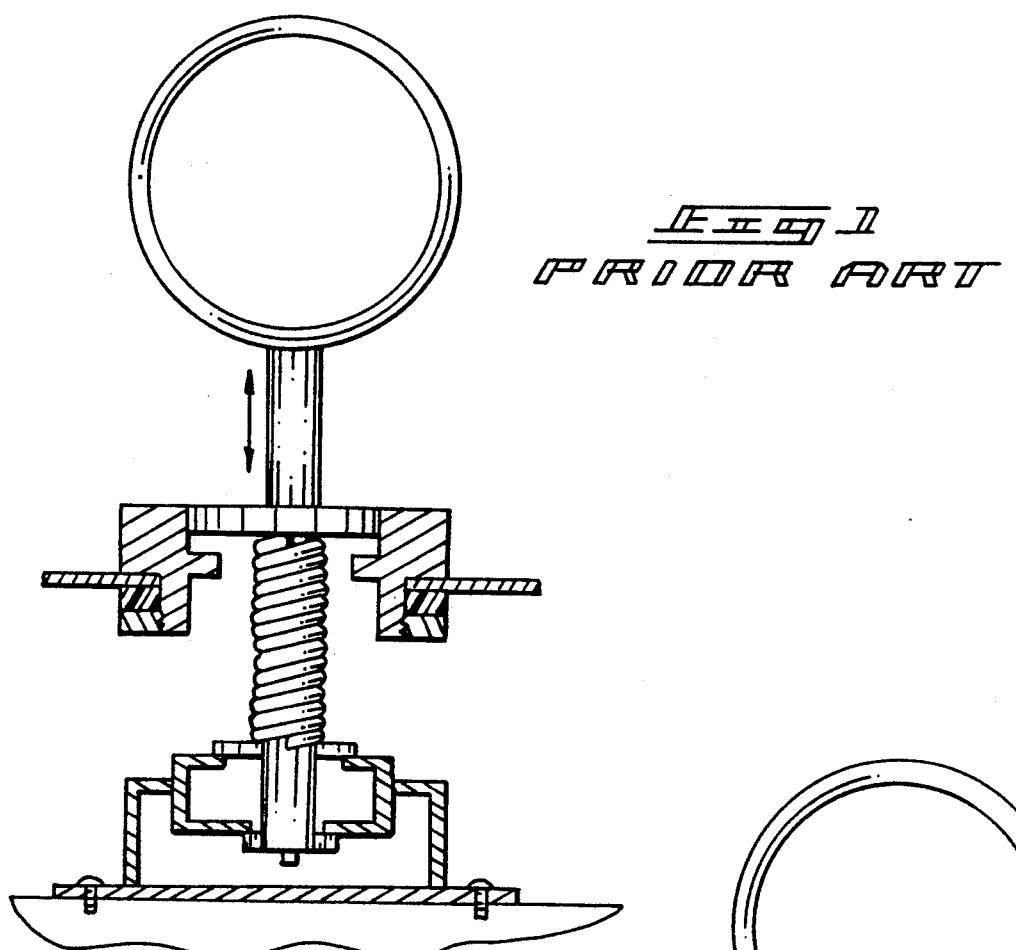
FIG. 1 is an orthographic view, taken in cross section, of a prior art hood ornament apparatus, as indicated in U.S. Pat. No. 4,913,941.

With reference now to the drawings, and in particular to FIGS. 1 to 6 thereof, a new and improved quick release vehicular hood ornament embodying the principles and concepts of the present invention and generally designated by the reference numeral 10 will be described.

Figure 2:
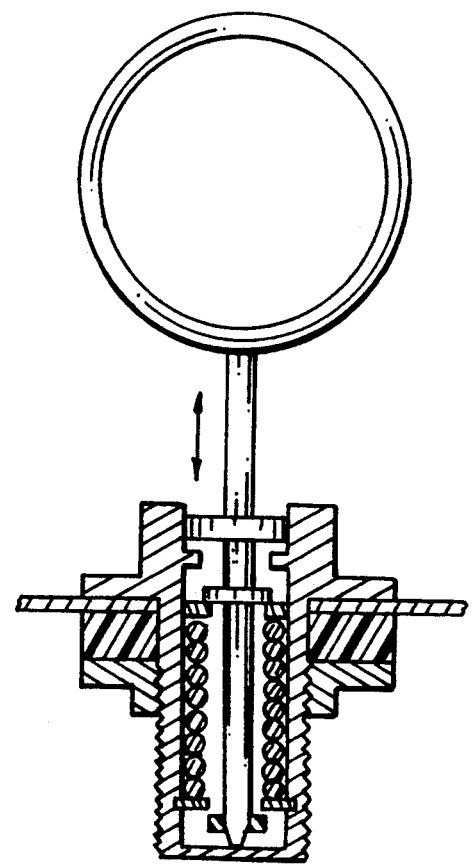
FIG. 2 is an orthographic cross-sectional illustration of the prior art hood ornament structure, as indicated in the U.S. Pat. No. 4,913,941, in a varied embodiment relative to FIG. 1.
Figure 5:
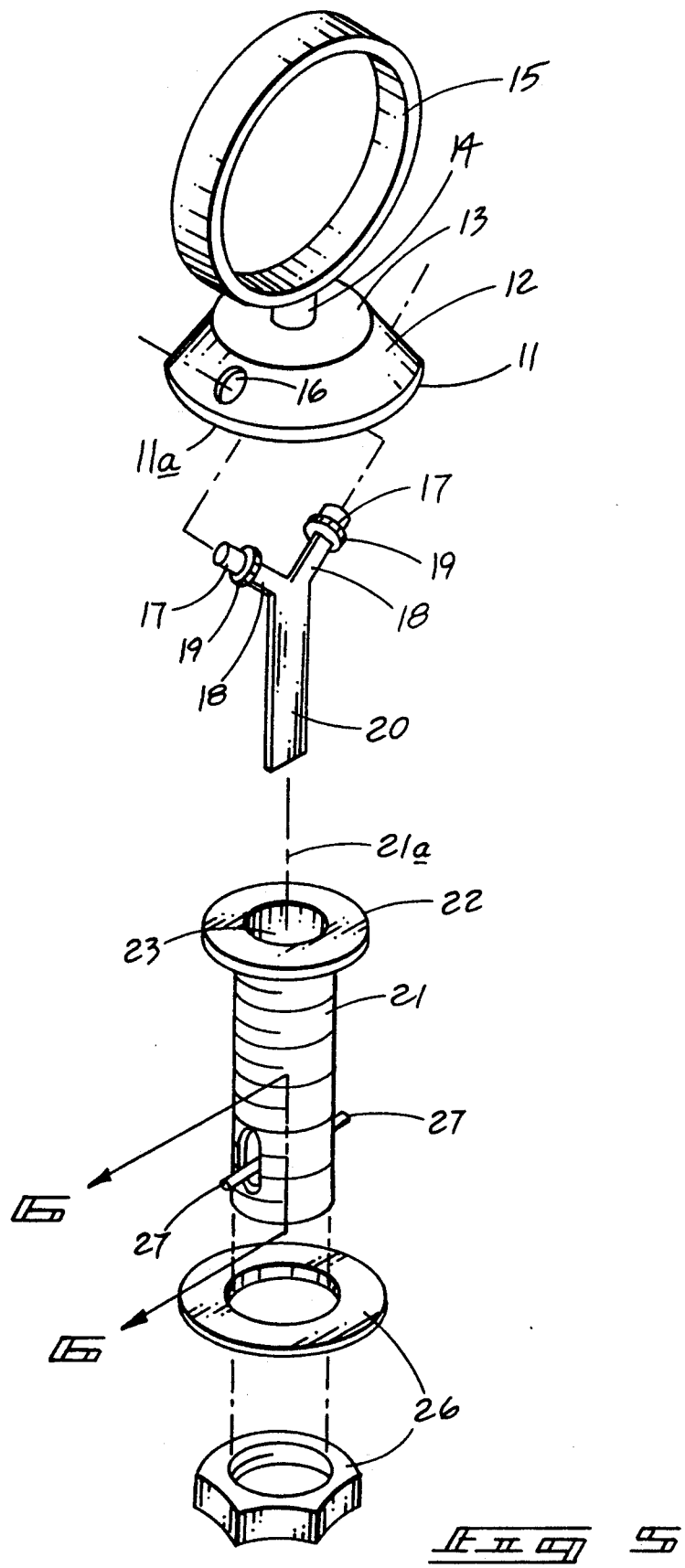
FIG. 5 is an isometric exploded view of the hood ornament to indicate the various components thereof.
Figure 6:
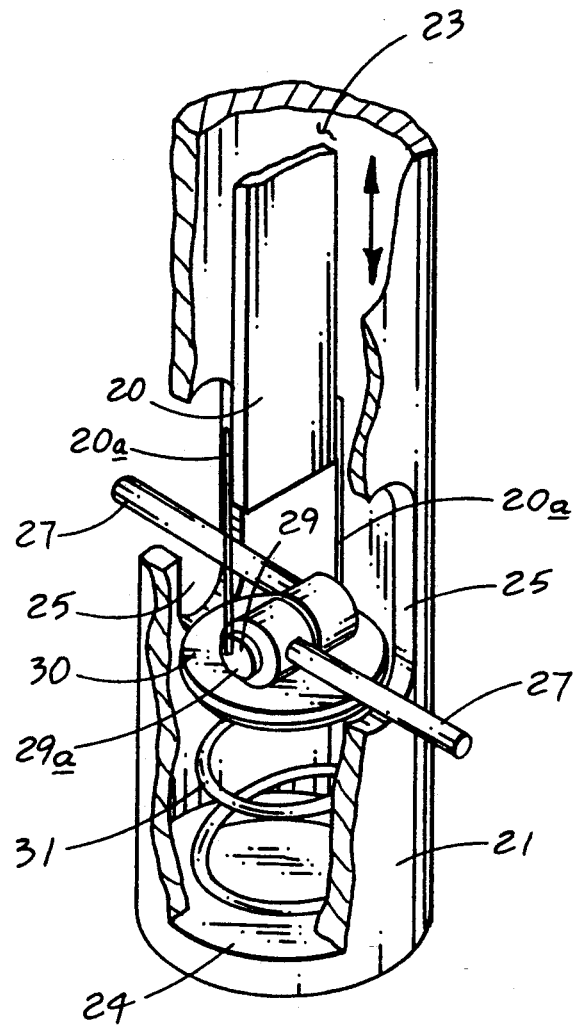
FIG. 6 is an isometric view, partially in section, of the support housing cooperating with the push bar structure of the invention.

FIGS. 1 and 2 indicate a releasable hood ornament, as set forth in U.S. Pat. No. 4,913,941, requiring depressing and rotation of the hood ornament stem relative to the vehicular hood.

More specifically, the quick release vehicular hood ornament 10 of the instant invention essentially comprises a base plate 11 having a truncated conical side wall 12 formed with a top wall 13 oriented parallel to a base plate floor 11a of the base plate 11. The base plate 11 is mounted to a top surface of the vehicular hood "H" as illustrated. An ornament support rod 14 extends orthogonally and upwardly of the top wall 13 mounting a hood ornament member 15 thereon. Side wall apertures 16 are directed on opposed sides of the side wall 12 slidably receiving a projecting rod 17 therethrough each aperture 16. A projecting rod support stem 18 mounts the support rod 17 in a longitudinally aligned relationship, with an abutment flange 19 projecting laterally beyond and in orthogonal relationship at an inner face of each projecting rod 17 and associated support stem 18. Push bar 20 is provided, with the support stems 18 integrally mounted to an upper distal end of the push bar 20 to define a Y-shaped configuration of the push bar and the support stems. The push bar is projected into a cylindrical support housing 21 that is externally threaded, having a housing flange 22 orthogonally mounted at an upper distal end of the support housing orthogonally oriented relative to an axis 21a of the support housing, with the housing further including a housing bore 23 directed into the housing receiving the push bar 20. The support housing 21 is formed with a housing floor and a pair of lock rod slots 25 directed through the side wall of the support housing diametrically opposed relative to one another adjacent the floor 24. In securing the support housing to the hood, lock fasteners 26 are provided, with at least one of the lock fasteners arranged to threadedly engage the externally threaded side wall of the support housing 21, with the hood "H" captured between the housing flange 22 and the lock fasteners 26. A lock rod 27 of a plurality of lock rods 27 is provided with at least one lock rod 27 directed through an associated slot 25. The lock rods 27 are directed interiorly of the support housing below the push bar 20 in engagement therewith, with the lock rods secured to a spring hinge 29 that normally biases the lock rods 27 towards one another The spring hinge 29 is positioned upon a support plate 30, with a support plate spring 31 captured between the support plate 30 and the housing floor 24. Upon projection of the push bar 20 by depressing the projecting rods 17, the spring hinge 29 is directed towards the floor 24 against the force of the support plate spring 31. In this manner, the lock rods 27 are received into the housing through the associated slots 25 to thereby permit removal of the lock rods and associated spring hinge 29 as a unit in association with the push bar 20. The push bar 20 is indicated in a spatial relationship relative to the spring hinge 29, but is in effect fixedly secured to a spring hinge axle 29a directed through the spring hinge on opposed sides thereof. Push bar legs 20a are provided on opposed sides of the push bar to secure the push bar to the axle 29a.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A quick release vehicular hood ornament arranged for securement to a vehicular hood, wherein the hood ornament comprises, a base plate, the base plate having a base plate floor, and a truncated conical side wall extending upwardly of the base plate floor, with the side wall terminating in a top wall, with the top wall oriented parallel relative to the base plate floor, a hood ornament member mounted to the top wall, with the base plate arranged for positioning above the vehicular hood, and a cylindrical support housing positioned below the vehicular hood coaxially aligned relative to the truncated conical side wall, the side wall including a plurality of side wall apertures, with the side wall apertures oriented on opposed sides of the side wall, with each side wall aperture of said side wall apertures including a projecting rod directed therethrough, the projecting rod including release means directed into the support housing to effect release of the base plate relative to the vehicular hood.

2. A hood ornament as set forth in claim 1 wherein the release means includes a plurality of support stems, and a push the support stems integrally mounted to an upper distal end of the push bar defining a Y-shaped configuration, with each support stem of said plurality of support stems longitudinally aligned and integrally secured to one of said projecting rods defining an interface between integral securement of each projecting rod with one of said support stems, and an abutment flange projecting laterally beyond each interface below the truncated conical side wall of the base plate.

3. A hood ornament as set forth in claim 2 wherein the cylindrical support housing includes a support housing floor, and a support housing flange mounted to an upper distal end of the support housing, with the support housing flange positioned below the vehicular hood, and a support housing bore directed into the support housing extending from the flange to the floor, and the push bar directed into the support housing through the housing bore, and a pair of lock rod slots diametrically directed through the support housing adjacent the floor, and a plurality of lock rods, with one of said lock rods directed through one of said slots, and the lock rods directed into the support housing, and spring hinge means positioned within the support housing to bias the lock rods interiorly of the support housing, and the spring hinge means including a spring hinge axle directed therethrough, and the push bar including a push bar lower distal end, the push bar lower distal end including a plurality of push bar legs to integrally secure the push bar to the spring hinge axle.

4. A hood ornament as set forth in claim 3 including a support plate, the support plate in contiguous communication with the spring hinge means below the spring hinge means, and a support plate spring captured between the support plate and the support housing floor.

* * * * *